April 19, 1955
G. P. SANDERS
2,706,437
ROW CROP THINNER
Filed March 25, 1952
2 Sheets-Sheet 1
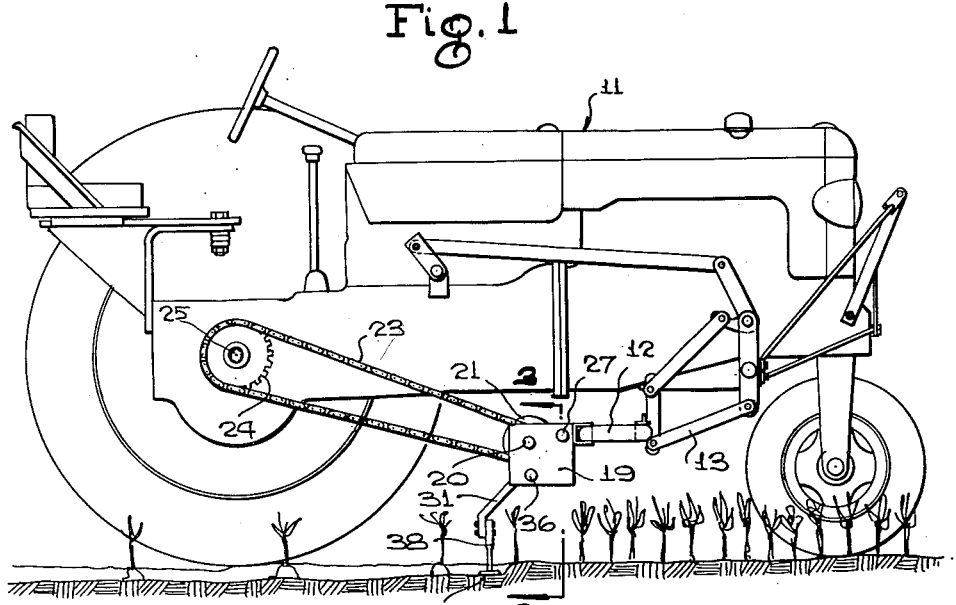
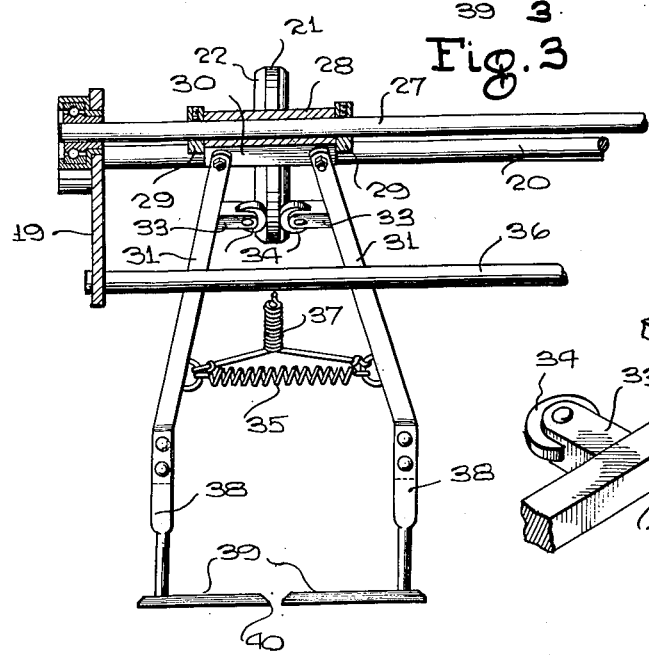
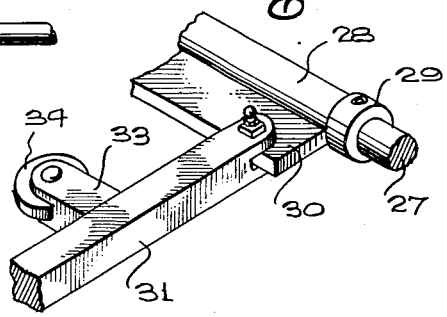
INVENTOR
GEORGE P. SANDERS
BY
McMorrow, Berman & Davidson
ATTORNEYS April 19, 1955  G. P. SANDERS  2,706,437
ROW CROP THINNER Filed March 25, 1952  2 Sheets-Sheet 2

INVENTOR
GEORGE P. SANDERS
BY
McMorrow, Berman + Davidson
ATTORNEYS

United States Patent Office 2,706,437
Patented Apr. 19, 1955

2,706,437

ROW CROP THINNER

George P. Sanders, Los Angeles, Calif.

Application March 25, 1952, Serial No. 278,319

2 Claims. (Cl. 97—21)

This invention relates to mechanical crop thinning devices, and more particularly to a crop thinning attachment adapted to be mounted on a tractor.

The main object of the invention is to provide a novel and improved row crop thinning apparatus adapted to be mounted on the cultivator bar of a tractor, said apparatus being simple in construction, being easy to install, and involving relatively few parts.

A further object of the invention is to provide an improved mechanical row crop thinning attachment for a tractor, said attachment involving inexpensive components, being rugged in construction, being reliable in operation, and being readily moved from its lowered operative position to a raised inoperative position by the operation of the cultivator bar lifting apparatus of the tractor on which the device is mounted.

Further objects and advantages of the invention will become apparent from the following description and claims, and from the accompanying drawings, wherein:

Figure 1 is a side elevational view of a conventional tractor with one rear wheel removed and provided with an improved mechanical crop thinning attachment constructed in accordance with the present invention.

Figure 3 is an enlarged cross sectional detail view taken on the line 3—3 of Figure 1.

Figure 5 is a fragmentary perspective detail view showing the upper portion of one of the pivoted blade-carrying arms of the crop thinning attachment shown in Figures 1 to 4.

Figure 2:
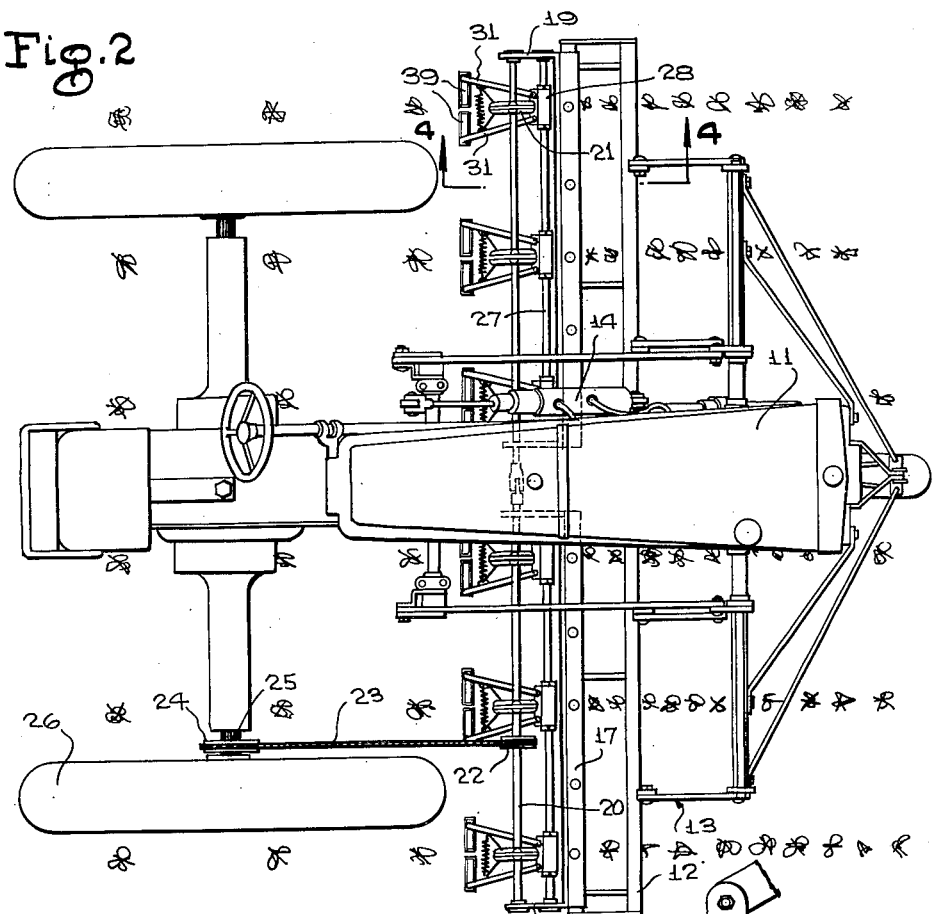
Figure 2 is a top plan view of the tractor of Figure 1.

Referring to the drawings, 11 designates a tractor of conventional construction provided with the transversely extending cultivator supporting frame 12 which is supported on a linkage indicated generally at 13 carried by the forward portion of the tractor and being arranged to be operated by the fluid pressure cylinder 14 of the tractor in a conventional manner to raise and lower the cultivator-supporting frame 12. The cultivator-supporting frame 12, the linkage 13, and the fluid pressure cylinder 14 are conventional elements and form no part of the present invention.

Figure 4:
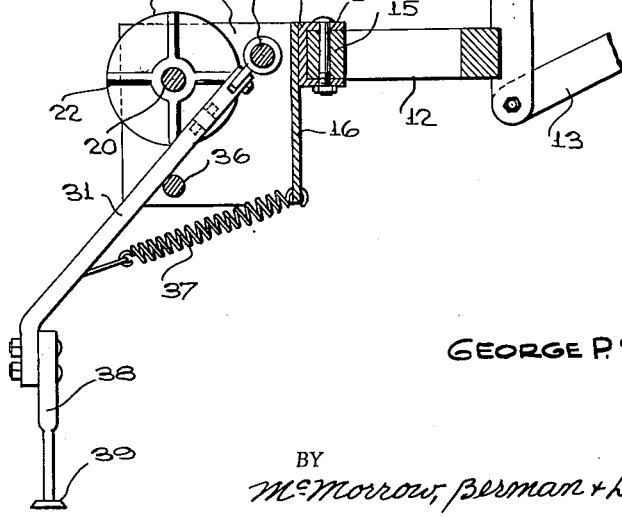
Figure 4 is an enlarged cross sectional detail view taken on the line 4—4 of Figure 2.

The cultivator-supporting frame 12 includes the transversely extending rear bar element 15. Designated at 16 is a transversely extending plate member which has rigidly secured to its upper marginal portion the channel bar 17 which is engaged over the frame bar 15. Extending through the flanges of the channel bar 17 and through the frame bar 15 are the fastening bolts 18 which secure the channel bar rigidly to the frame bar 15. The plate member 16 extends laterally for a substantial distance on opposite sides of the tractor and is formed at its ends with supporting arms 19, 19 extending at right angles to the main body of the plate member 16. Rotatably mounted in the arms 19, 19 is a transversely extending shaft 20 on which are rigidly secured the spaced cam disks 21, said cam disks being spaced in accordance with the spacing between adjacent rows of growing crops to be thinned by the crop-thinning attachment. Each cam disk 21 is formed on opposite sides thereof with circumferentially spaced outwardly extending cam elements 22, for example with four equally spaced ribs, as shown in Figure 4. Secured on the shaft 20 is a sprocket wheel 22 which is coupled by a sprocket chain 23 to a sprocket wheel 24 secured on the rear axle 25 of the tractor, whereby the shaft 20 is driven responsive to the movement of the tractor, due to the driving coupling between the rear ground engaging wheel 26 and the shaft 20. Obviously, the shaft 20 may be coupled to any other convenient driven element of the tractor, or may be coupled to a ground-engaging wheel provided specifically for the purpose of driving said shaft, said ground engaging wheel being journaled to any suitable portion of the tractor frame.

Designated at 27 is a transversely extending shaft which is mounted on the flanges 19, 19 adjacent their upper forward corners, as shown in Figure 4. Rotatably mounted on the shaft 27 are the spaced sleeve members 28 which are positioned in longitudinal alignment with the respective cam disks 21 and which are retained in aligned positions with respect to said cam disks by respective collars 29, 29 secured on the shaft 27 at opposite ends of the sleeve members 28. Rigidly secured to each sleeve member 28 is a longitudinally extending radial plate 30, and pivotally secured to each plate 30 adjacent opposite ends thereof are shear arms 31, 31 which extend downwardly and rearwardly on opposite sides of an adjacent cam disk 21. Each of the arms 31, 31 has rigidly secured to its intermediate portion an inwardly projecting bar member 33 provided with a roller 34 journaled in its end portion, the rollers 34 forming cam elements which engage opposite sides of the associated cam disk 21. The lower portions of the shear arms 31, 31 are connected by a coil spring 35, biasing said arms towards each other and urging the rollers 34, 34 into engagement with the respective opposite surfaces of the disc member 21. It will be readily apparent that as the disc member 21 rotates, the rollers 34, 34 engage the radial ribs 22, causing the arms 31, 31 to be cammed outwardly intermittently, whereas the spring 35 causes said arms to move toward each other when the rollers 34 leave the ribs 22.

Secured to the lower marginal portions of the flanges 19, 19 is the transverse stop rod 36 which extends beneath the shear arms 31, 31 and is adapted to support said arms in their lowered positions. The arms 31, 31 are biased toward said lowered position by respective coil springs 37 connected between the respective arms and the lower margin of the transverse plate member 16, as shown in Figures 3 and 4.

Secured to the lowermost ends of the shear arms 31, 31 are depending legs 38, 38, carrying at their lower ends inwardly extending cooperating plant thinning blades 39, 39. The thinning blades 39, 39 are formed with sharp cutting edges around their entire perimeters, and may be substantially rectangular in shape, as shown in Figure 2. When the rollers 34, 34 engage the main body portions of the disc members 21, the inner edges of the thinning blades, designated at 40, 40 are disposed relatively close together, whereas said inner edges are separated by substantial distances when the rollers 34, 34 engage the camming ribs 22 of the disc members.

In operation of the device, as the tractor moves over the rows of growing crops, the thinning blades 39, 39 cut the growing plants and are periodically separated by the engagement of the rollers 34, 34, as above explained, whereby the growing plants are left undisturbed at predetermined, desired spacings, in accordance with the intermittent outward camming movement of the arms 31, 31. As shown in Figure 2, a plurality of rows of crops may be simultaneously thinned as the tractor moves along the rows, each row of crops being thinned by an individual thinning unit mounted thereover and operated by the movement of the tractor along the rows.

When it is desired to elevate the thinning apparatus to inoperative position, it is merely necessary to operate the linkage 13 by means of the fluid pressure cylinder 14, whereby the cultivator frame bar 12 is elevated, lifting the thinning blades 39, 39 to substantial distances above ground level.

While a specific embodiment of an improved mechanical crop thinning attachment for a tractor has been disclosed in the foregoing description, it will be understood that various modifications within the spirit of the invention may occur to those skilled in the art. Therefore, it is intended that no limitations be placed on the inven-

What is claimed is:

1. A plant thinner for attachment to a farm tractor having rear traction wheels and a vertically movable tool bar carried ahead of said wheels and extending transversely of and beyond the opposite sides of the tractor, said thinner comprising a pair of aligned units carried by the tool bar on opposite sides of the longitudinal axis of the tractor, each unit comprising a horizontal supporting plate rigidly connected to the tool bar, brackets carried by and extending in rearwardly parallel relation from said plate adjacent opposite ends thereof, a drive shaft rotatably carried by and extending through said brackets, drive means connected to said traction wheels and to said drive shaft for rotating said drive shaft, cam disks fixed to each drive shaft and longitudinally spaced therealong, said disks including parallel faces having radially extending circumferentially spaced projections extending outwardly from either face, a horizontal supporting bar carried by and extending between said brackets forward of and spaced above the shafts, longitudinally spaced, laterally fixed sleeves rotatably mounted on the support bar, said sleeves being in longitudinal alignment with said cam disks, a pair of tool supporting arms connected at one end in pivotal relation to each of said seleeves and extending in rearwardly disposed relation, one on each side of the adjacent cam disks, cam followers carried by said tool supporting arms and projecting inwardly therefrom toward the oppositely disposed cam surfaces, a tension spring connected between said arms for moving the cam followers into constant contact with said adjacent cam disks, blades carried on the rear ends of said tool supporting arms for chopping plants out of a row, a stop bar carried by said brackets and extending below said tool support arm and parallel to said driven shaft for limiting movement of said arms downwardly about said support bar and tension means carried by said support plate and connected to said tool carrying arms to yieldably urge the arms against the stop bar.

2. Subject matter set forth in claim 1 wherein said drive shafts are disposed in each unit in longitudinal alignment with each other transversely of the tractor, a flexible coupling connecting the adjacent ends of the shafts, one of said shafts being connected to one of said tractor traction wheels.

References Cited in the file of this patent

UNITED STATES PATENTS

| Number | Name | Date |
|---|---|---|
| 336,865 | Murray | Feb. 23, 1886 |
| 797,875 | Sugg et al. | Aug. 22, 1905 |
| 1,254,548 | Sutton | Jan. 22, 1918 |
| 2,202,433 | Schumacher | May 28, 1940 |
| 2,491,304 | Evans | Dec. 13, 1949 |
| 2,582,513 | Swafford | Jan. 15, 1952 |